(12) United States Patent
Kawolics et al.

(10) Patent No.: US 6,644,510 B2
(45) Date of Patent: Nov. 11, 2003

(54) BAG-IN-BOX CONTAINER AND FAUCET

(75) Inventors: Raymond P. Kawolics, Solon, OH (US); Michael H. Meyer, Sagamore Hills, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 10/186,846

(22) Filed: Jun. 28, 2002

(65) Prior Publication Data

US 2003/0029885 A1 Feb. 13, 2003

Related U.S. Application Data (60) Provisional application No. 60/302,259, filed on Jun. 29, 2001.

(51) Int. Cl.[7] .................................................. B65D 35/56
(52) U.S. Cl. ........................ 222/105; 222/463; 222/482; 222/494; 222/500; 222/522; 222/559; 222/566
(58) Field of Search .................................. 222/105, 107, 222/212, 463, 491, 494, 500, 481.5, 559, 562, 563, 566, 567, 568, 482, 522, 465.1; 224/148.1, 148.2, 148.4, 906; 229/117.27; 137/852, 854

(56) References Cited

U.S. PATENT DOCUMENTS

| | | | |
|---|---|---|---|
| 2,571,893 A | * | 10/1951 | Kendall ........................ 429/54 |
| 2,913,749 A | | 11/1959 | Ayres |
| 3,173,579 A | | 3/1965 | Curie et al. |
| 3,203,454 A | | 8/1965 | Micallef |
| 3,206,079 A | | 9/1965 | Mancusi, Jr. |
| 3,231,149 A | | 1/1966 | Yuza |
| 3,403,696 A | * | 10/1968 | Pynchon ................. 137/516.13 |
| 3,456,650 A | | 7/1969 | Schwartzman |
| 3,618,825 A | | 11/1971 | Clarke |
| 3,949,934 A | | 4/1976 | Goglio |
| 4,174,727 A | | 11/1979 | Riddel |
| 4,799,598 A | | 1/1989 | McFadyen |
| 4,836,416 A | * | 6/1989 | Shalgi et al. .................. 222/48 |
| 4,846,378 A | | 7/1989 | Kim |
| 5,213,236 A | * | 5/1993 | Brown et al. ................ 222/212 |
| 5,271,432 A | | 12/1993 | Gueret |
| 5,325,885 A | * | 7/1994 | Ivan et al. ................... 137/217 |
| 5,556,008 A | | 9/1996 | Silver et al. |
| 5,704,522 A | | 1/1998 | Orgeolet et al. |
| 5,806,719 A | * | 9/1998 | Witty et al. .................. 222/105 |
| 5,829,637 A | | 11/1998 | Takemura et al. |
| 5,868,285 A | | 2/1999 | Boyte, Sr. |
| 5,890,620 A | | 4/1999 | Belcastro |
| 5,931,189 A | * | 8/1999 | Sweeney et al. ........ 137/512.15 |
| 6,079,449 A | | 6/2000 | Gerber |
| 6,089,271 A | | 7/2000 | Tani |

OTHER PUBLICATIONS

US 3,994,393, 11/1976, Nilson (withdrawn)

* cited by examiner

Primary Examiner—Gene Mancene
Assistant Examiner—Patrick Buechner
(74) Attorney, Agent, or Firm—Fay, Sharpe, Fagan, Minnich & McKee, LLP (57) ABSTRACT

A bag-in-box container includes a faucet for dispensing liquid from the container upon tipping or other movement of the container. The faucet includes a body defining a bore. A valve seat and valve member are located in the bore. The valve member includes a resilient seal portion normally resiliently biased into sealing engagement with the valve seat to inhibit air flow into the bag of the container. The resilient seal portion is selectively deflectable away from the valve seat under fluid pressure to allow flow of liquid from the inlet of the bore to the outlet of the bore when said box is moved to a position where liquid in the bag exerts pressure on the seal portion.

17 Claims, 6 Drawing Sheets

BAG-IN-BOX CONTAINER AND FAUCET

CROSS-REFERENCE TO RELATED APPLICATION

This application claims priority from and the benefit of the filing date of U.S. provisional application No. 60/302,259 filed Jun. 29, 2001.

BACKGROUND OF THE INVENTION

The present invention relates generally to faucets for dispensing liquids and, more particularly, to faucets adapted for dispensing liquid from a bag-in-box container. Although described with reference to bag-in-box containers, those of ordinary skill in the art will recognize that a faucet formed in accordance with the present invention can be used to dispense liquid from any of a wide variety of other rigid or flexible containers.

Bag-in-box containers and associated faucets for dispensing liquid therefrom are well known and in common use. Heretofore, faucets for bag-in-box containers have included a manually activated valve for controlling the flow of liquid through the faucet. Using these faucets, a user has been required to displace a lever, depress a button, or otherwise manipulate the faucet valve to open same and allow fluid flow out of the faucet. Some users have found use of these faucets difficult and/or inconvenient. This difficulty has been compounded by the fact that many users prefer to tip the bag-in-box or other container while holding the valve open to increase fluid flow through the faucet, especially when the container is less full. Of course, tipping the container while manipulating the valve makes it difficult for a user to position a glass or other receptacle beneath the outlet of the faucet.

SUMMARY OF THE INVENTION

In accordance with a first aspect of the present invention, a bag-in-box container includes a box and a flexible bag defining an interior space for holding liquid. The bag is located at least partially in the box. The faucet includes a body defining a bore having an inlet and an outlet, and the inlet of the bore is in fluid communication with the interior space of the bag. A valve seat is located in the bore, and a valve member includes a resilient seal portion that is normally resiliently biased into sealing engagement with the valve seat to inhibit air flow into the interior space of said bag through the bore. The resilient seal portion is selectively deflectable away from the valve seat under fluid pressure to allow flow of liquid from the inlet of the bore to the outlet of the bore when the box is moved to a position where liquid in the interior space of the bag exerts pressure on the seal portion.

In accordance with another aspect of the present invention, a faucet includes a body defining a bore having an inlet and an outlet. A valve seat is located in the bore. A valve member includes a resilient seal portion normally resiliently biased into sealing engagement with the valve seat to inhibit air flow from the outlet of the bore to the inlet of the bore. The resilient seal portion is selectively deflectable away from the valve seat under fluid pressure to allow flow of liquid from the inlet to the outlet.

BRIEF DESCRIPTION OF THE DRAWINGS

The invention takes form in a variety of components and arrangements of components, a preferred embodiment of which is illustrated in the accompanying drawings that form a part hereof a wherein.

DETAILED DESCRIPTION OF THE PREFERRED EMBODIMENT

Figures 1A, 1B:
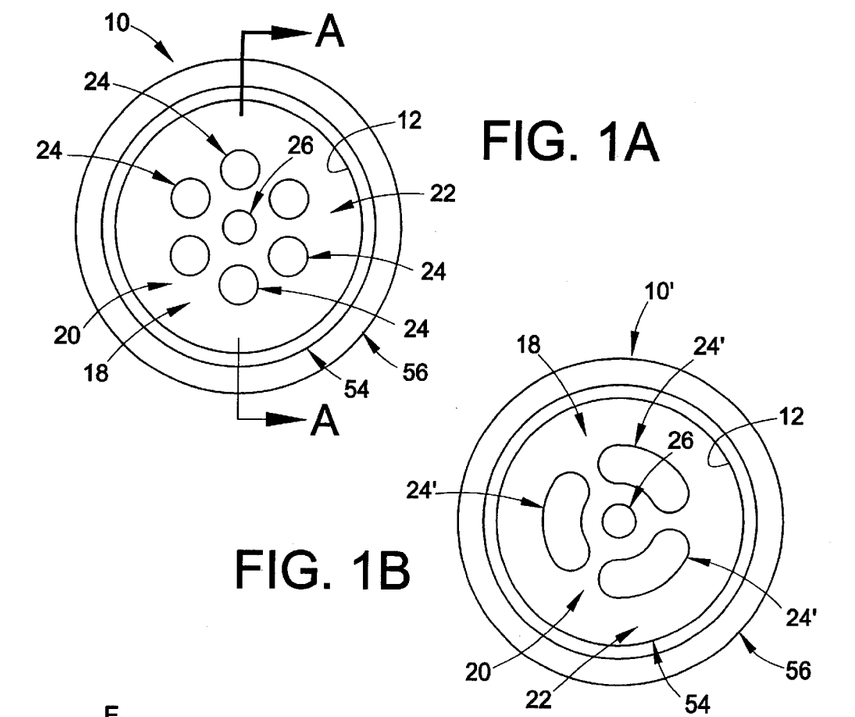
FIG. 1A is an enlarged front elevational view of a first embodiment of a faucet body formed in accordance with the present invention with the umbrella valve member removed.
FIG. 1B is an enlarged front elevational view of a second embodiment of a faucet body formed in accordance with the present invention with the umbrella valve member removed.
Figure 2:
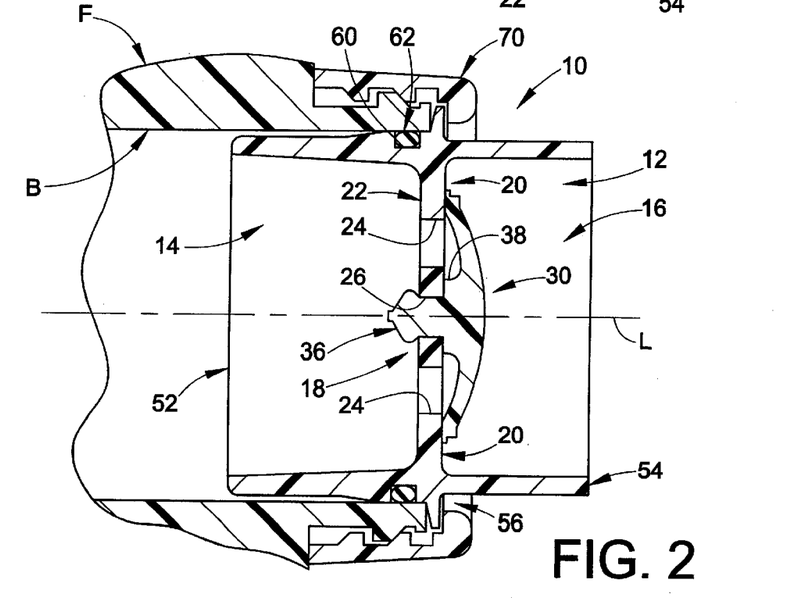
FIG. 2 is a greatly enlarged sectional view taken along line A—A of FIG. 1A, showing the umbrella valve in its first or normally closed operative position within the faucet body and showing the faucet body operatively secured to a fitment of an associated bag-in-box container.

Faucets formed in accordance with first and second embodiments of the present invention are shown in FIGS. 1A–6. FIGS. 1A and 2 show a faucet body 10 formed in accordance with the present invention. The body 10 is preferably defined from molded plastic, but other suitable materials such as metal can be used. The body 10 is elongated along a longitudinal axis L and is generally cylindrical. The body 10 includes an axial through-bore 12 that has an inlet 14 defined in a first or inner end of the body and an outlet 16 defined in a second or outer end of the body. A diffuser 18 is located in the bore 12 between the inlet 14 and outlet 16, and the diffuser defines a valve seat 20. As illustrated herein, the diffuser 18 and valve seat 20 thereof are defined by a wall or bulkhead 22 that spans the bore 12, wherein a plurality of fluid-flow apertures 24 are defined through the bulkhead. These apertures 24 are preferably evenly and symmetrically defined about the axis L. As shown in FIG. 1B, an alternative faucet body 10' is identical in all respects to the faucet body 10, but includes kidney-shaped apertures 24', rather than circular-shaped apertures, to improve flow of liquid through the faucet body 10'.

Figure 3:
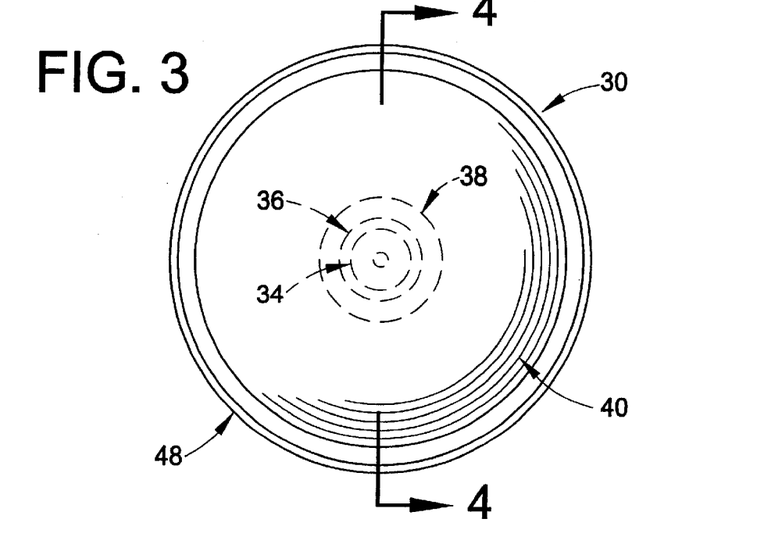
FIG. 3 is an enlarged front elevational view of an umbrella valve formed in accordance with the present invention.
Figure 4:
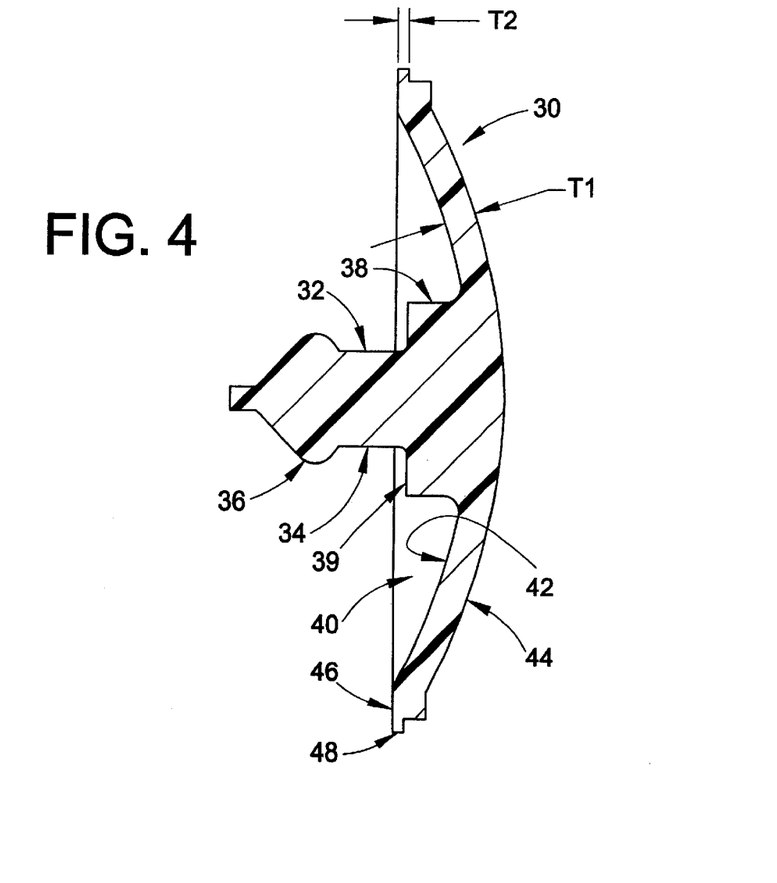
FIG. 4 is a greatly enlarged sectional view taken along line 4—4 of FIG. 3.

The faucet further comprises an umbrella valve member 30 (FIG. 2) that controls fluid flow from the inlet 14 to the outlet 16 of the bore 12. The umbrella valve member 30 is preferably a one-piece construction defined from a resilient elastomeric or thermoplastic elastomeric material such as silicone or the like. With reference also to FIGS. 3 and 4, the umbrella valve member 30 includes a projecting anchor 32 including a shank 34 that terminates in an enlarged, bulbous distal end 36. The bulkhead 22 of the faucet body 10, 10' includes a central aperture 26 adapted to receive and retain the anchor 32 of the umbrella valve member 30. The bulbous distal end 36 of the anchor is larger than the aperture 26 and, thus, once passed through the aperture, the bulbous portion 36 resists pull-out. Preferably, the axial length of the shank 34 of the seal anchor 32 corresponds to or is slightly less than the axial thickness of the bulkhead 22.

The umbrella valve member 30 also comprises a seal portion or member 40 interconnected to the anchor 32 by way of a generally cylindrical anchor base 38. The seal portion 40 has a circular periphery (FIG. 3), and it is curved or dished toward the anchor 32 so that an inner surface 42 thereof defines a concavity, while the opposite, outer surface 44 is convex.

The seal portion 40 is dimensioned so that, when the anchor 32 is operatively secured in the aperture 26 of the bulkhead 22, the inner surface 42 of the seal portion 40 covers all of the fluid-flow apertures 24 defined in the bulkhead, and so that a portion of the inner surface 42 sealingly engages a portion of the bulkhead 22 that lies radially outward relative to the fluid-flow apertures 24. Furthermore, it is preferred that when the anchor 32 is secured in the bulkhead aperture 26, the seal portion 40 is symmetrically and coaxially positioned relative to the axis L, with an inner face 39 of the anchor base 38 abutting the bulkhead 22.

To ensure fluid-tight sealing, the inner face 42 of the seal portion 40 includes a planar peripheral sealing region 46 (FIG. 4) adapted to abut and sealingly engage the planar bulkhead 22. Furthermore, the seal portion 40 comprises a continuous circumferentially extending sealing lip 48 that is reduced in thickness relative to the remainder of the seal portion 40. In the embodiment illustrated in FIG. 4, for example, the seal portion 40 defines a thickness T1 of approximately 1.0 millimeter (mm), whereas the peripheral sealing lip defines a thickness T2 of less than 0.5 mm. The relative thinness of the lip 48 ensures that it can form a fluid-tight seal with the bulkhead 22.

With reference again to FIGS. 1A, 1B and 2, the faucet body 10, 10' includes an inner end 52, an outer end 54, and an intermediate radial flange 56. The inner end 52 is preferably cylindrical or slightly frusto-conical (converging in a direction moving away from the flange 56) and is adapted for close, sliding receipt into a bore B defined by a fitment F of an associated container such as a bag-in-box container. The inner end 52 of the faucet body 10, 10' preferably defines an O-ring receiving groove 60 in its outer surface, and an O-ring seal 62 is seated therein to sealingly engage the faucet body with the fitment F when the inner end 52 of the body is inserted into the fitment bore B.

When the inner end 52 of the faucet body 10, 10' is fully inserted into the fitment bore B, the flange 56 abuts the fitment F. A retainer or nut 70 is advanced onto coacting threads of the fitment F and holds the flange 56 in abutment with the fitment F as illustrated in FIGS. 2 and 5.

Figure 6:
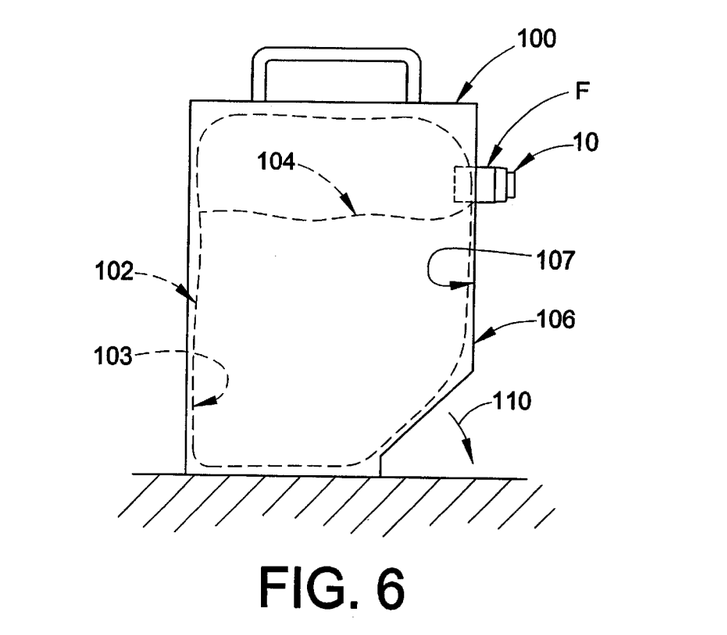
FIG. 6 is a side elevational view of a bag-in-box container including a faucet formed in accordance with the present invention connected thereto.

FIG. 6 illustrates an example of a container to which the subject faucet can be operatively connected. The illustrated container is a bag-in-box container including a flexible bag 102 that defines an interior space 103 for holding a volume of liquid 104. An outer protective covering or box 106 defined from cardboard, plastic or other suitable material defines an interior space 107. The box 106 holds the bag 102 in the space 107, but a portion of the bag 102 can extend outwardly of the box 106 without departing from the overall scope and intent of the present invention. A fitment F is fluidically connected to the bag 102 and projects outwardly from the bag and box. A faucet formed in accordance with the present invention is fluidically secured to the fitment F as described above so that the body 10, 10' projects outwardly from the fitment.

Figure 5:
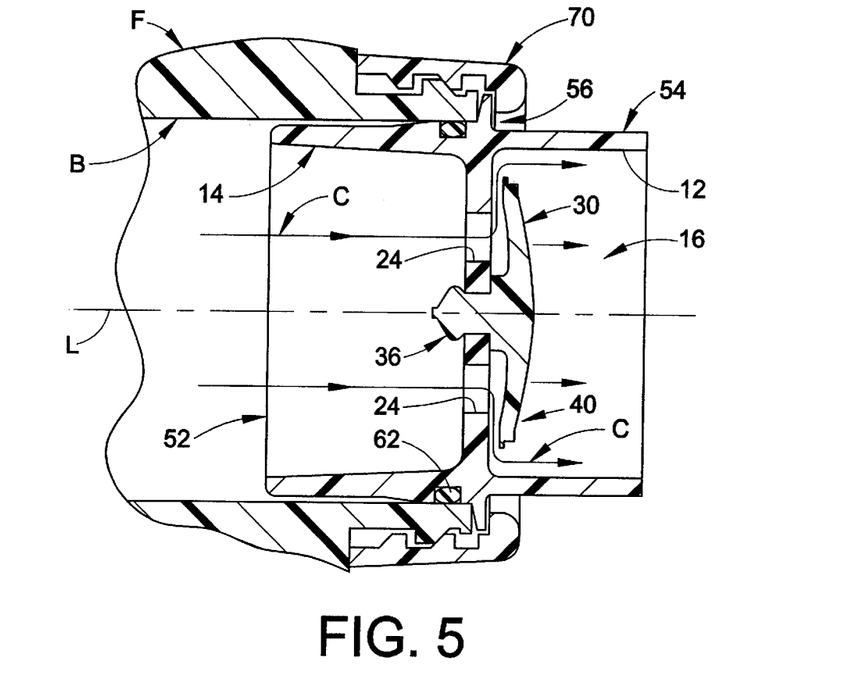
FIG. 5 is a sectional view similar to FIG. 2, but showing the umbrella valve of the faucet in its second, opened position.

Referring also now to FIGS. 2 and 5, operation of the subject faucet will be described. Normally, the seal portion 40 of the umbrella seal 30 sealingly engages the seat 20 defined by the diffuser 18 to prevent entry of air into the bag 102. Upon tipping or otherwise moving the associated container 100 (indicated by the arrow 110 in FIG. 6) to a position where sufficient fluid pressure is exerted on the sealing member 40, the seal portion 40 resiliently deforms and moves away from the bulkhead 22 as illustrated in FIG. 5. This, then, allows fluid held by the associated container to flow from the inlet 14 of the bore 12, through the apertures 24, to the outlet 16 of the bore 12 and into a waiting drinking glass or other receptacle as indicated by the arrows C. When the associated container is returned to its home or non-dispensing position so that no fluid pressure is exerted on the seal portion 40 (i.e., when the container to which the faucet is attached is un-tipped), the natural resiliency and shape of the seal portion 40 cause it to return to its normally closed position, with the sealing region 46 and lip 48 again forming a seal with the diffuser 18. Of course, the faucet must be located on the bag-in-box container 100 or other container such that, when the container is placed in its untipped or non-dispensing position, fluid pressure exerted on the seal portion 40 by the fluid 104 in the container is insufficient to unseat the seal portion 40.

Figure 7:
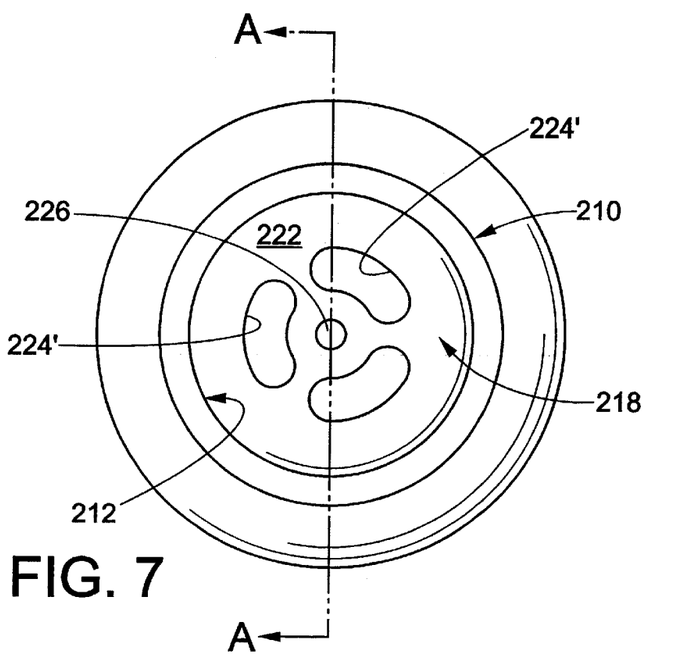
FIG. 7 is a greatly enlarged front elevational view of a faucet body formed in accordance with another alternative embodiment of the present invention.
Figure 7A:
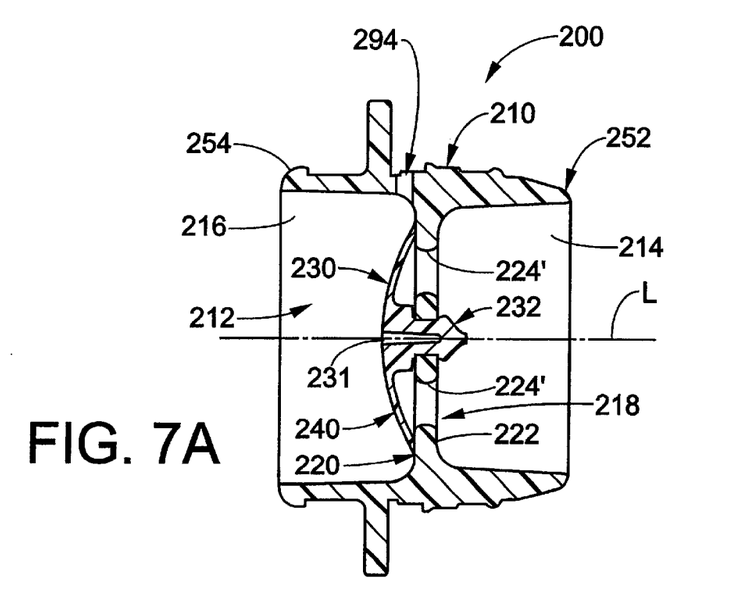
FIG. 7A is a sectional view taken along line A—A of FIG. 7 and also showing an operatively installed umbrella seal member.
Figure 8A:
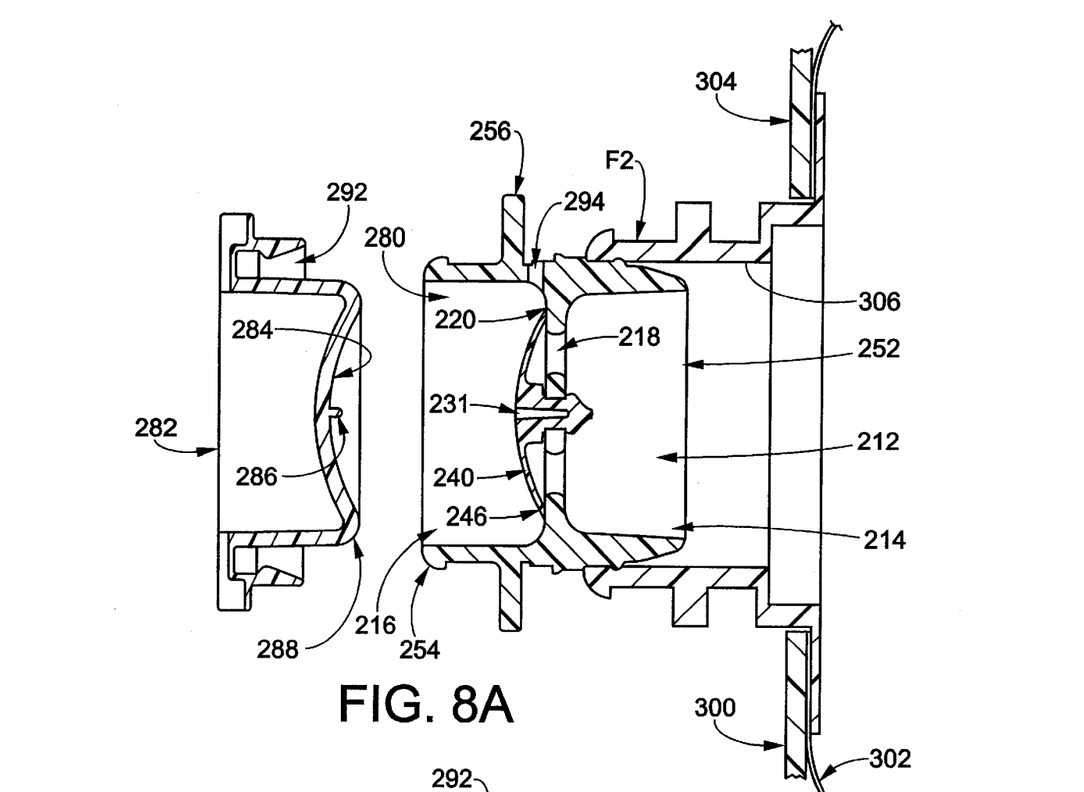
FIG. 8A is similar to FIG. 7A but shows the faucet of FIG. 7A connected, in a first (temporary) position to a fitment of a bag-in-box container.
Figure 8B:
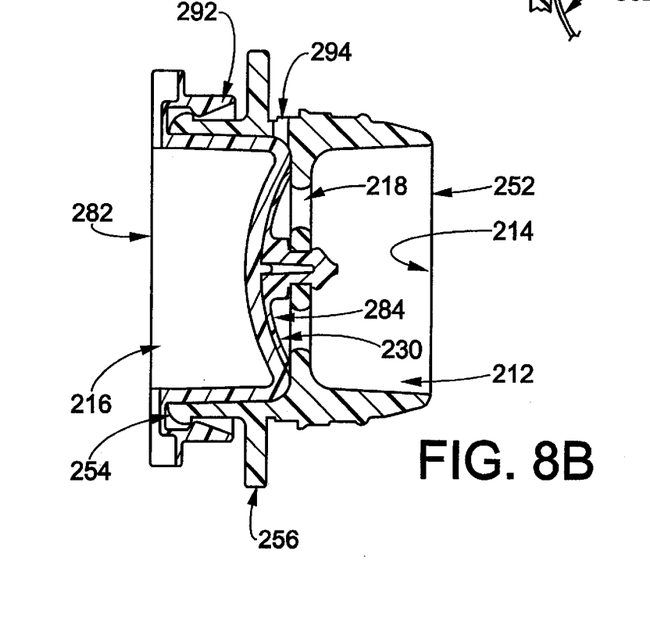
FIG. 8B shows the faucet of FIG. 7A with a dustcap operatively installed.
Figure 8C:
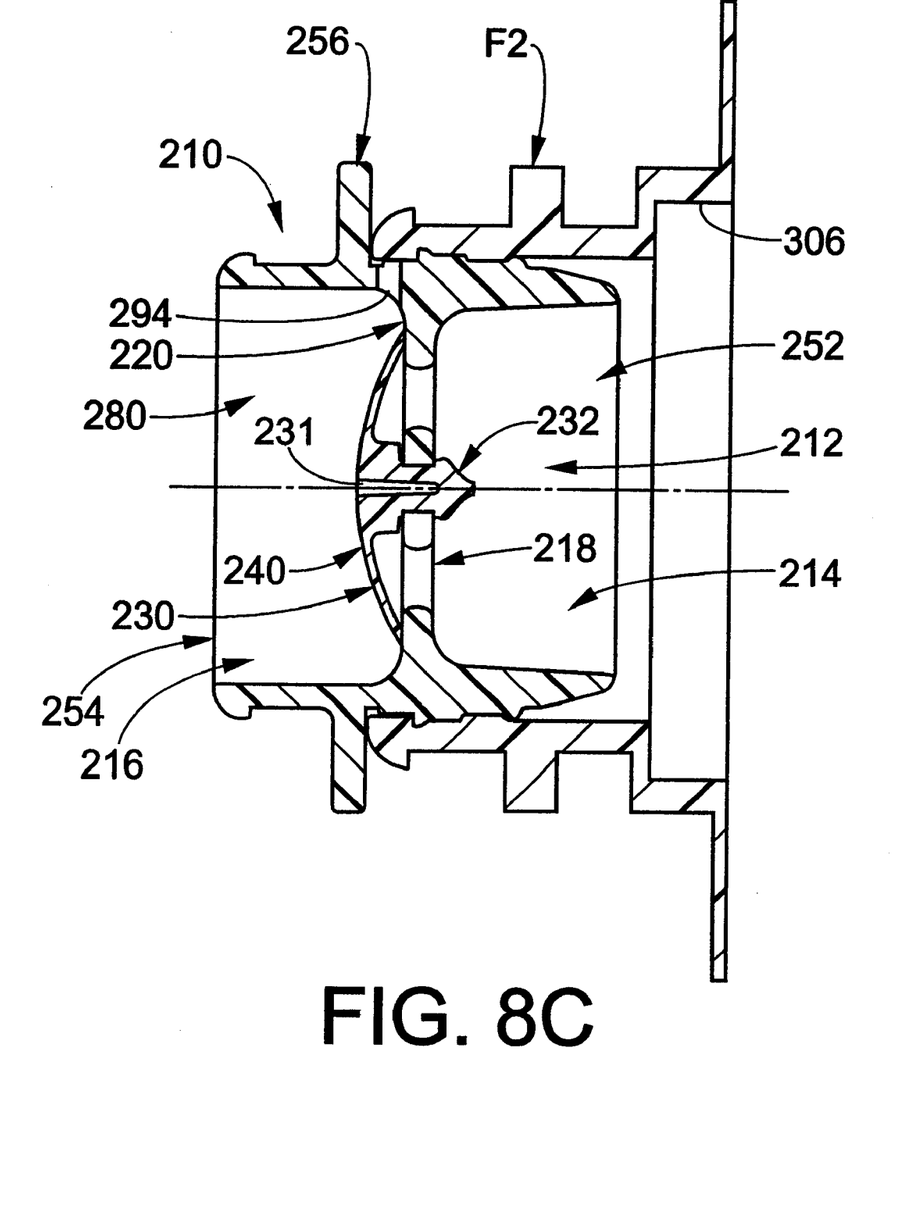
FIG. 8C is similar to FIG. 8A, but shows the faucet connected to the fitment in a second, operative position.

FIGS. 7–8C illustrate another alternative embodiment of a faucet 200 formed in accordance with the present invention. Except as otherwise shown and/or described, the faucet 200 is identical to the faucet embodiments disclosed above and like components are identified with like reference numbers that are 200 greater than those in FIGS. 1A–6.

Referring to FIGS. 7 and 7A, the faucet 200 comprises a generally cylindrical molded plastic body 210 defined about a longitudinal axis L. The body 210 defines a bore 212 that extends therethrough along the axis L and that has an inlet 214 at a first or inner end 252 of the body 210 and an outlet 216 at a second or outer end 254 of the body 210. A wall 222 spans the bore 212 and defines a diffuser 218 with apertures 224' and a valve seat 220.

As shown in FIG. 7A, the faucet 200 comprises an umbrella valve member 230 operatively connected to the diffuser 218 and sealingly engaged with the valve seat 220. The umbrella valve member 230 is structured and functions identically to the valve member 30 described above, except that it includes a central opening 231 that opens in the seal portion 240 and that extends partially through the anchor 232. As noted, the umbrella valve member 230 is otherwise identical to the umbrella valve member 30 and further discussion of the correspondingly numbered components is not required.

With reference now to FIG. 8A, the body 210 is adapted to mate with an associated fitment F2 of a bag-in-box container 300. The bag-in-box container 300 comprises a flexible fluid-holding bag 302 that is contained within a cardboard or other outer container 304. The fitment F2 defines an outlet passage 306 that communicates with the fluid-holding space defined by the bag. The inner end 252 of the faucet 200 is closely slidably received in the fitment passage 306 so that the bore 212 of the faucet 200 communicates with the fitment passage 306. The faucet body 210 is secured to the fitment F2 in one of two different positions, i.e., a temporary position as shown in FIG. 8A and an operative position as shown in FIG. 8C. In both positions, the faucet body 210 is secured to the fitment with a snap-fit as shown. In the second, operative position (FIG. 8C), the flange 256 of the body 210 is abutted with the fitment F2 to prevent further movement of the body 210 into the passage 306.

With continuing reference to FIGS. 8A and 8B, the outlet 216 of the bore 212 cooperates with the diffuser to define a cap-receiving recess 280. The faucet 200 preferably comprises a removable cap 282 that is selectively received and retained in the recess 280. Specifically, the cap 282 is dimensioned for close sliding receipt in the outlet 216 and defines an inner face 284 that closely mates with the seal portion 240 of the umbrella seal member 230 (FIG. 8B). A stud 286 projects from the inner face 284 and is received into the opening 231 of the umbrella seal member 230 to inhibit any undesired movement of the seal member 230. The inner face 284 of the cap 282 also defines an annular peripheral edge 288 that engages the peripheral sealing region 246 of the umbrella valve member 230 when the cap 282 is fully inserted into the recess 280 as shown in FIG. 8B to prevent air and fluid flow past the umbrella seal member 230 when the cap 282 is installed as shown in FIG. 8B. To releasably secure the cap 282 to the body 210, the cap 282 defines an annular groove 292 that receives the outer end 216 of the body and that engages same with a snap-fit as shown in FIG. 8B.

To facilitate insertion of the cap 282 into the recess 280 and removal of the cap 282 from the recess without disturbing the umbrella seal 230, the faucet 200 defines at least one vent passage 294 that extends therethrough on the downstream (outlet) side of the diffuser 218, but is located upstream or inward relative to the flange 256, i.e., the vent passage 294 is preferably located axially between the flange 256 and the diffuser 218. The vent passage 294 can have any desired cross-sectional shape, e.g., circular, elliptical, etc., and extends into the bore 212 (more particularly into the recess 280) from an external opening defined in an outer wall of the body 210 to allow flow of ambient air into and out of the bore 212 therethrough.

When the body 210 is secured to a fitment F2 in the temporary position as shown in FIG. 8A, the vent passage 294 is open and vents the recess 280 to facilitate insertion and removal of the cap 282. This venting has been found to be important to prevent excessive air pressure or vacuum force from acting on the umbrella seal member 230 during cap insertion/removal as could unseat and/or dislodge the seal portion 240 of the umbrella seal member 230. On the other hand, when the body 210 is fully inserted into the passage 306 of the fitment F2 in its operative position as shown in FIGS. 8B and 8C, the vent passage 294 is blocked by the fitment F2, itself, and the vent passage 294 becomes inoperative.

The faucet 200 functions in the same manner as the faucet embodiments disclosed in FIGS. 1A–6, except that the faucet 200 (including a cap 282 fully connected thereto as shown in FIG. 8B) is connected to an empty bag 302 using the temporary position as shown in FIG. 8A. To fill the bag 302, the faucet body 210 is separated from the fitment F2 and the bag 302 is filled through the fitment passage 306. After the bag 302 is filled, the faucet body 200 (including the installed cap 282) is operatively connected to the fitment F2 as shown in FIG. 8C so that the vent passage 294 is blocked. Of course, to dispense liquid from the bag 302, the cap 282 is separated from the body 210 to open the outlet 216 and the container 300 is tipped or otherwise moved so that liquid in the bag 302 exerts pressure on the seal portion 240 and moves same away from the seat 220, thereby opening the bore 212 for fluid flow from the inlet 214 to the outlet 216. When the container 300 is moved to a position where fluid pressure is not exerted on the seal portion 240, the seal portion 240 returns to its normally-closed position where it is engaged with the seat 220 and located in covering relation relative to the apertures 224'.

The invention has been described with reference to a preferred embodiment. Obviously, modifications and alterations will occur to others upon reading and understanding the preceding specification. It is intended that the invention be construed as including all such modifications and alterations.

Having thus described the preferred embodiments, what is claimed is:

1. A bag-in-box container comprising:
   a box;
   a flexible bag defining an interior space for holding liquid, said bag located at least partially in said box;
   a faucet comprising:
      a body defining a bore having an inlet and an outlet, said inlet of said bore in fluid communication with said interior space of said bag;
      a valve seat located in said bore;
      a valve member comprising a resilient seal portion normally resiliently biased into sealing engagement with said valve seat to inhibit air flow into said interior space of said bag through said bore, said resilient seal portion selectively deflectable away from said valve seat under fluid pressure to allow flow of liquid from said inlet of said bore to said outlet of said bore when said box is moved to a position where liquid in said interior space of said bag exerts pressure on said seal portion.

2. The bag-in-box container as set forth in claim 1, wherein said seal portion comprises a convex outer surface oriented toward said outlet of said bore and a concave inner surface oriented toward said inlet of said bore.

3. The bag-in-box container as set forth in claim 2, wherein said valve member further comprises a shank projecting outwardly from said concave inner surface of said seal portion.

4. The bag-in-box container as set forth in claim 1, further comprising:
   a protective cap selectively and releasably connected to said body to block said outlet.

5. The bag-in-box container as set forth in claim 4, wherein said body comprises a vent passage defined therein and that extends from an external opening in said body into the bore between said outlet and said seal portion.

6. The bag-in-box container as set forth in claim 5, further comprising:
   a fitment connected to said bag and defining a flow passage that is in fluid communication with said interior space of said bag, wherein said faucet body is connectable to said fitment in first and second positions, wherein said fitment blocks said vent passage in one of said first and second positions.

7. The bag-in-box container as set forth in claim 5, wherein said body of said faucet defines a recess that closely receives said cap, said cap engaging and preventing movement of said seal portion away from said seat when said cap is connected to said body.

8. The bag-in-box container as set forth in claim 1, wherein said faucet further comprises:

a diffuser located in said bore between said inlet and outlet, said diffuser defining a plurality of flow apertures therein that communicate liquid from an upstream side of said diffuser to a downstream side of said diffuser, wherein said seal portion of said valve member covers all of said flow apertures when said seal portion is sealingly engaged with said valve seat.

9. The bag-in-box container as set forth in claim 8, wherein said valve seat and said diffuser are defined by a wall that spans said bore of said body.

10. The bag-in-box container as set forth in claim 9, wherein said valve member further comprises a shank that projects outwardly from said seal portion, said shank fixedly secured to said wall.

11. The bag-in-box container as set forth in claim 10, wherein said valve member is defined as a one-piece construction from an elastomeric compound and defines an overall umbrella-like shape.

12. A faucet comprising:
a body defining a bore having an inlet and an outlet;
a valve seat located in said bore; and,
a valve member comprising a resilient seal portion normally resiliently biased into sealing engagement with said valve seat to inhibit air flow from said outlet of said bore to said inlet of said bore, said resilient seal portion selectively deflectable away from said valve seat under fluid pressure to allow flow of liquid from said inlet of said bore to said outlet of said bore, wherein said body of said faucet comprises a vent passage defined therein and that extends from an external opening in said body into the bore between said outlet and said seal portion, said faucet further comprising a cap releasably connected to said body adjacent said outlet.

13. The faucet as set forth in claim 12, wherein said faucet further comprises:
a diffuser located in said bore between said inlet and outlet, said diffuser defining a plurality of flow apertures therein that communicate liquid from an upstream side of said diffuser to a downstream side of said diffuser, wherein said seal portion of said valve member covers all of said flow apertures when said seal portion is sealingly engaged with said valve seat.

14. The faucet as set forth in claim 12, wherein said body of said faucet defines a recess that closely receives said cap, said cap engaging and preventing movement of said seal portion away from said seat when said cap is connected to said body.

15. The faucet as set forth in claim 12, wherein said seal portion comprises a convex outer surface oriented toward said outlet of said bore and a concave inner surface oriented toward said inlet of said bore.

16. The faucet as set forth in claim 15, wherein said valve member further comprises a shank projecting outwardly from said concave inner surface of said seal portion.

17. A liquid storing and dispensing apparatus comprising:
a container defining an interior space for holding liquid;
a faucet connected to said container, said faucet comprising:
a body defining a bore having an inlet and an outlet, said inlet in fluid communication with said interior space of said container;
a valve seat defined in said bore; and,
a valve member comprising a resilient seal portion normally resiliently biased into sealing engagement with said valve seat to inhibit air flow into said interior space of said container through said bore, said resilient seal portion selectively deflectable away from said valve seat under fluid pressure in response to tipping of said container to a position where liquid in said interior space exerts pressure on said seal portion to allow flow of liquid out of said container interior space through said outlet of said bore of said faucet.

* * * * *